Figure 2:
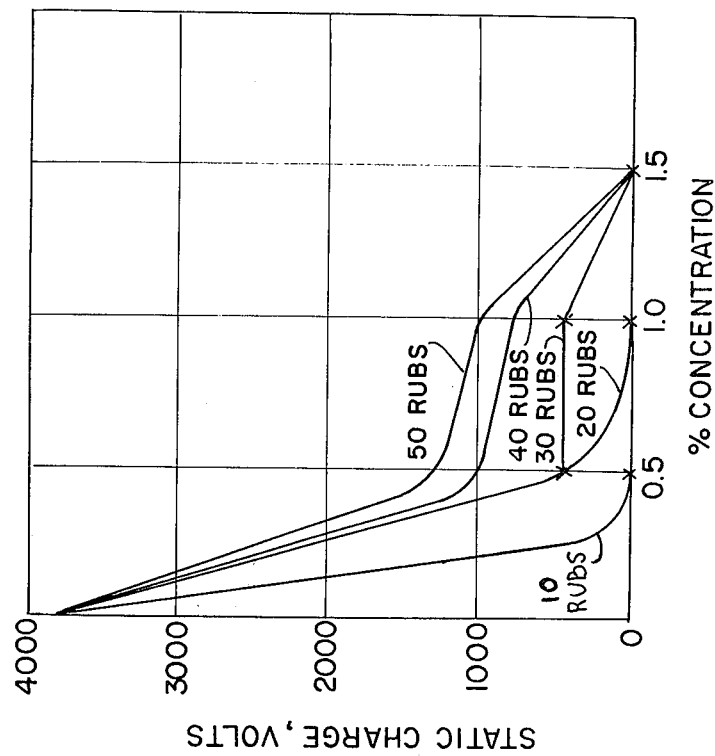

United States Patent
Baron et al.

[19]

[11] 3,933,779

[45] Jan. 20, 1976

[54] ANTISTATIC POLYMER BLEND

[75] Inventors: Seymour Baron, Wayne, N.J.; H. Harald Lutzmann, Cleveland, Ohio

[73] Assignee: Fine Organics Inc., Cleveland, Ohio

[22] Filed: Feb. 21, 1974

[21] Appl. No.: 444,560

[52] U.S. Cl. .............. 260/93.5 A; 260/DIG. 19; 260/DIG. 20
[51] Int. Cl.² ............ C08K 5/19; C08F 12/08; C08F 112/08
[58] Field of Search ............ 260/93.5 A, 19, 20

[56] References Cited
UNITED STATES PATENTS

| | | | |
|---|---|---|---|
| 2,891,878 | 4/1955 | Chamberlain | 117/138.8 |
| 3,324,091 | 6/1967 | Savides | 260/80.7 |
| 3,535,294 | 10/1970 | Marumo et al. | 260/80.7 |

Primary Examiner—Joseph L. Schofer
Assistant Examiner—F. R. Cervi

[57] ABSTRACT

An antistatic polymer blend comprising a synthetic polymer and an antistatically effective amount of a compound of the formula:

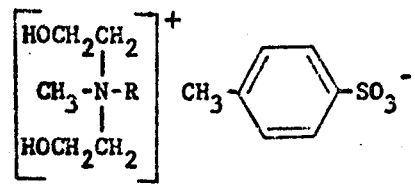

wherein R is alkyl of 4 to 18 carbon atoms unsubstituted or substituted by halo or aryl.

11 Claims, 2 Drawing Figures

ANTISTATIC POLYMER BLEND

The present invention relates to anti-static synthetic polymers.

Synthetic polymers are essentially electrical insulators or non-conductors. This non-conductivity permits large charges of static electricity to build up on the surfaces of the polymers, attracting dust and other contaminants and making processing difficult either by attraction to other objects or by discharge of the built-up charge on handling.

It is an object of this invention to provide a synthetic polymer containing an antistat in or on the polymer to prevent buildup of surface static charge.

Synthetic polymers have been previously provided with antistats, but there have been only a limited number of such materials due to the stringent requirements of a successful antistat. These requirements include:

1. the antistat should be capable of being uniformly distributed throughout the polymer;
2. the antistat must withstand processing (e.g. extrusion) temperatures normally encountered in working with the polymer;
3. the antistat must not change the important properties of the polymer;
4. the antistat should not make the polymer surface tacky; and
5. the cost of the antistat, at the effective amount to be used, must be economically justified.

To satisfy these requirements, the antistat is normally used in small amounts, e.g. 1 percent by weight, based on the polymer, or less, both for economy's sake as well as to minimize any sacrifice of polymer properties caused by the antistat.

The present invention provides an antistatic polymer blend comprising a synthetic polymer and an antistatically effective amount of a compound of the formula:

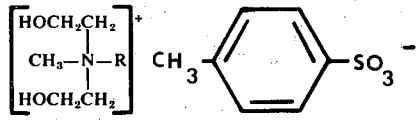

wherein R is alkyl of 4 to 18 carbon atoms unsubstituted or substituted by halo or aryl.

The term alkyl of 4 to 18 carbon atoms denotes a univalent saturated branched or straight hydrocarbon chain containing from 4 to 18 carbon atoms. Representative of such alkyl groups are thus butyl, isobutyl, sec.butyl, tert.butyl, pentyl, isopentyl, neopentyl, tert.-pentyl, hexyl, isohexyl, heptyl, octyl, nonyl, decyl, undecyl, dodecyl, tridecyl, tetradecyl, pentadecyl, hexadecyl, heptadecyl, octadecyl, and the like.

The term halogen includes the substituents fluoro, chloro, bromo and iodo. Chloro and bromo are preferred.

The term "aryl" denotes a univalent aromatic hydrocarbon of from 6 to 30 carbon atoms and one or two rings as, for example, phenyl, phenyl substituted by one or more lower alkyl, biphenyl, biphenyl substituted by one or more lower alkyl, naphthyl, naphthyl substituted by one or more lower alkyl, and the like, the term "lower alkyl" denoting alkyl of 1 to 6 carbon atoms.

It is preferred that R is alkyl of 4 to 12 carbon atoms, most preferably 8 to 12 carbon atoms.

Representative compounds of formula (I) useful in this invention are:

1. methyl-butyl-bis(2-hydroxyethyl)ammonium paratoluene sulfonate,
2. methyl-isopentyl-bis(2-hydroxyethyl)ammonium paratoluene sulfonate,
3. methyl-(4-chlorobutyl)-bis(2-hydroxyethyl)ammonium paratoluene sulfonate,
4. methyl-(4-phenylbutyl)-bis(2-hydroxyethyl)ammonium paratoluene sulfonate,
5. methyl-hexyl-bis(2-hydroxyethyl)ammonium paratoluene sulfonate,
6. methyl-octyl-bis(2-hydroxyethyl)ammonium paratoluene sulfonate,
7. methyl-decyl-bis(2-hydroxyethyl)ammonium paratoluene sulfonate,
8. methyl-dodecyl-bis(2-hydroxyethyl)ammonium paratoluene sulfonate,
9. methyl-tetradecyl-bis(2-hydroxyethyl)ammonium paratoluene sulfonate,
10. methyl-octadecyl-bis(2-hydroxyethyl)ammonium paratoluene sulfonate.

The synthetic polymer used in the polymer blend of the present invention may be any thermoplastic or thermosetting polymer, including, but not limited to, polystyrene, polyester, polyamide, polycarbonate, polyolefin, polyacetal, phenolformaldehyde resin, polyvinyl chloride, ABS, polyurethane, preferably polystyrene.

The antistat of formula (I) is effective in an amount of from 0.1 to 2 percent, and preferably is used in an amount of 0.2 to 1 percent, by weight, based on the weight of the polymer. The antistat of formula (I) is stable at processing temperatures, e.g. it is stable at 200°C for at least 10 minutes, as shown by no weight loss, no fuming and no darkening. It is liquid above 100°C, which can aid in blending with the polymer.

The antistat is incorporated in or on the polymer, preferably in the polymer. When incorporated in the polymer, the antistat will "bloom" on the surface to provide an antistatic coating. This will be more permanent than an externally applied coating, since the externally applied coating can be easily removed by wear, wiping, handling, movement in transit, etc., whereas with the internally incorporated antistat if the conductive surface layer should be wiped or worn off in handling or processing, a new layer will bloom to the surface.

To apply the antistat externally, it is dissolved in water, lower alkanol or other solvent and sprayed on the surface of the polymer to deposit the desired amount of antistat.

In the case of the internally incorporated antistat, generally a masterbatch of polymer and antistat is formed, using a Banbury or other mill machine, to provide a blend containing about 5 to 15 percent, by weight, of the antistat, preferably 10 percent by weight, based on the polymer. The masterbatch is then added to the polymer in the extrusion or molding stage, or by milling, to provide the desired antistatically effective amount of antistat stated above.

The compound of formula (I) may be readily prepared by reacting approximately equimolar amounts of the amine (II) and para-toluenemethyl sulfonate (III), in the presence of a solvent, e.g. water, at a temperature of about 60° to about 80°C, as follows:

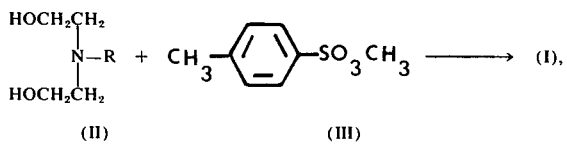

where R is as defined above. The reaction ensues immediately and results in virtually stoichiometric yield. If the solvent is water, in an amount of 5 percent, by weight, or less, based on the compound of formula (I), the reaction mass can be recovered as such without the need for isolation of the quaternary salt (I) from the solvent, since this small amount of water is not harmful to the polymer. While a slush at room temperature, the watercontaining reaction product becomes a clear liquid at higher temperatures, such as 30°C and higher.

The amine (II) can readily be formed by heating an amine $RNH_2$, where R is as defined above, with ethylene oxide in slight excess of 2 mols ethylene oxide per mol of $RNH_2$ at a temperature of at least 150°C, preferably 150°–190°C, such as 170°C. It has been shown that this results in essentially quantitative yield of tertiary amine (II).

The following Examples illustrate the present invention.

EXAMPLE 1

A flask was charged with 220g. bis-(2-hydroxyethyl)-octylamine and 21g. $H_2O$ and heated to 70°C. 186g. paratoluene methyl sulfonate were added and the reaction ensued immediately. The product was methyl-octyl-bis(2-hydroxyethyl)ammonium paratoluene sulfonate in the form of a slush or mush at room temperature, but a clear liquid at 30°C and higher.

EXAMPLE 2

The product of Example 1 and methyl-dodecyl-bis(2-hydroxyethyl)-ammonium paratoluene sulfonate were incorporated at 0.5, 1.0, and 1.5%, by weight concentration, into Dow Chemical Company's 5215 medium impact polystyrene and injection molded into five-inch square plaques at 50 mil thickness. Three plaques were made for each antistat at each concentration, plus three plaques without any antistat as a control.

Figure 1:
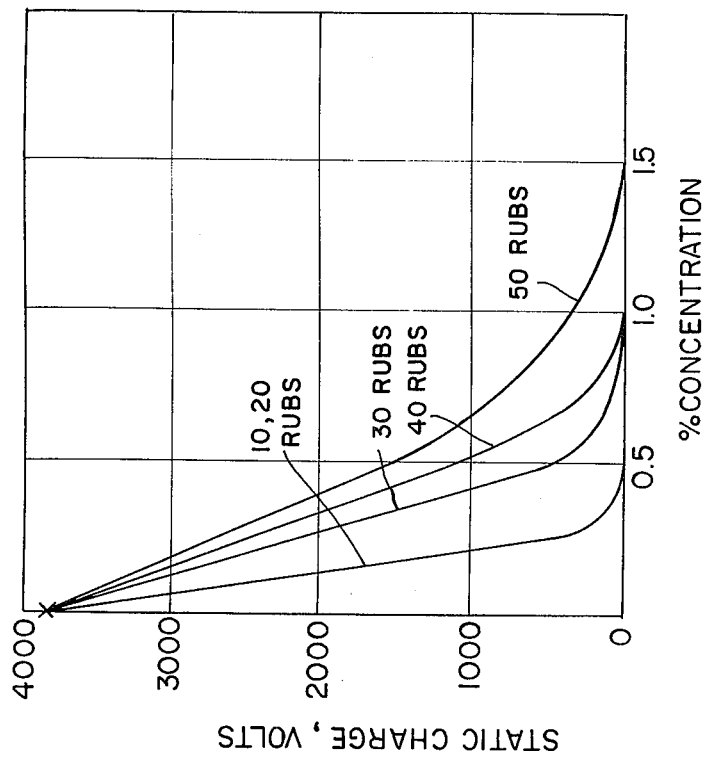

All of the plaques were charged by rubbing with 100 percent virgin wool using a pressure of about ½ psi and a speed of about 5 inches per second. Rubbing was done in units of ten times, always in the same direction. The relative humidity and the temperature were maintained at 43 percent and 75°F, respectively. The static charges were measured using a single leaf electroscope which was calibrated for voltage versus leaf deflection, using a 10,000 volt power supply, and the results are reported as the arithmetic average of each set of three plaques at each concentration and the control. FIGS. 1 and 2 show the results obtained by using methyl-octyl-bis(2-hydroxyethyl)-ammonium paratoluene sulfonate and methyl-dodecyl-bis(2-hydroxyethyl)-ammonium paratoluene sulfonate, respectively.

While certainly a static charge of 0 volts is considered to be perfect, a value of 500 volts is acceptable. For example, disposable plastic sheets used in surgical operating rooms must not accumulate a static charge greater than 500 volts. A limitation on static charge for most consumer products has not yet been determined.

Although similar to the "ash-tray" test, the test procedure employed above is more stringent in that the environmental conditions are controlled and the static charge is quantitatively measured.

EXAMPLE 3

An aqueous solution containing 2 percent, by weight, of the product of Example 1 is sprayed on a 50-mil polystyrene sheet and air dried to provide an antistatic layer containing 2 percent, by weight, of the antistat, based on the weight of the polymer. The coated polymer prevents buildup of static charge.

EXAMPLE 4

To demonstrate the good surface characteristics of the polymer blend of the invention, a blend of polystyrene and methyloctyl-bis(2-hydroxyethyl)ammonium paratoluene sulfonate was prepared in the manner of Example 2, but at a concentration of 25 percent, by weight. The antistat bloomed on the surface but did not become tacky, even after being exposed to the air for five days.

This is indeed a highly surprising result, since methyloctyl-bis(2-hydroxyethyl)ammonium paratoluene sulfonate is highly deliquescent and virtually forms a liquid upon exposure to air in a short period of time, and yet when the material "blooms" on the surface of the polymer, no such deliquescence is observed, even when the overly large amount of 25 percent, by weight, is used.

What is claimed is:

1. A synthetic polymer having incorporated therewith an antistatically effective amount of a compound of the formula:

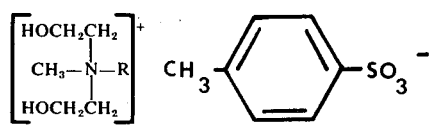

wherein R is alkyl of 4 to 18 carbon atoms unsubstituted or substituted by halogen or aryl.

2. The synthetic polymer according to claim 1, wherein the compound is on the surface of the polymer.

3. The synthetic polymer according to claim 1, wherein the compound is distributed throughout the polymer.

4. The synthetic polymer according to claim 1, wherein the amount of said compound is from about 0.1 to about 2 percent, by weight, based on the weight of the polymer.

5. The synthetic polymer according to claim 1, wherein the amount of said compound is from about 0.2 to about 1 percent, by weight, based on the weight of the polymer.

6. The synthetic polymer according to claim 1, wherein R is alkyl of 4 to 18 carbon atoms.

7. The synthetic polymer according to claim 1, wherein R is alkyl of 8 to 12 carbon atoms.

8. The synthetic polymer according to claim 1, wherein said compound is methyl-octyl-bis(2-hydroxyethyl)-ammonium paratoluene sulfonate.

9. The synthetic polymer according to claim 1, wherein said compound is methyl-dodecyl-bis(2-hydroxyethyl)-ammonium paratoluene sulfonate.

10. The synthetic polymer according to claim 1, wherein said synthetic polymer is polystyrene.

11. A masterbatch of a synthetic polymer having incorporated therein from 5 to 15 percent, by weight, based on the weight of the polymer, of a compound of the formula:

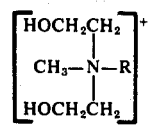 

wherein R is alkyl of 4 to 18 carbon atoms unsubstituted or substituted by halogen or aryl.

* * * * *